Patented Aug. 16, 1938

2,127,380

UNITED STATES PATENT OFFICE 2,127,380

INSECTICIDE AND FUNGICIDE

Frederick E. Dearborn, Washington, D. C., dedicated to the free use of the People of the United States No Drawing. Application April 14, 1937,
Serial No. 136,817

4 Claims. (Cl. 167—22)

(Granted under the act of March 3, 1883, as
amended April 30, 1928; 370 O. G. 757)

This application, which is in part a continuation of my pending application filed May 17, 1933, bearing Serial No. 671,569, is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the People of the United States to take effect on the granting of a patent to me.

This invention comprehends a new product, an insecticide and fungicide, comprising an intimately and nonseparable mixture of two or more new compounds of the general formula $3CuAs_2O_4 \cdot CuOR$, in which R is the anhydride of a monocarboxylic acid of any of the following series of fatty acids, namely, $C_nH_{2n}O_2$, $C_nH_{2n-2}O_2$, $C_nH_{2n-4}O_2$, $C_nH_{2n-6}O_2$, and $C_nH_{2n-8}O_2$, together with unsaponifiable matter and copper salts of the fatty acids.

I have found that a complex compound of the general formula $3CuAs_2O_4 \cdot CuOR$, in which R is the anhydride of a monocarboxylic acid, can be made from all of the fatty acids included in the following series $C_nH_{2n}O_2$, $C_nH_{2n-2}O_2$, $C_nH_{2n-4}O_2$, and $C_nH_{2n-6}O_2$, and $C_nH_{2n-8}O_2$. I wish to obtain Letters Patent for a new insecticide and fungicide being the product resulting from bringing together and causing to react a solution of an alkali metal arsenite, a solution of an inorganic cupric salt, and the product obtained by saponifying a vegetable, animal or fish oil or fat, containing the mixed glycerides of any of the monocarboxylic acids of the series of fatty acids above enumerated. Vegetable oils and fats, such as coconut oil, cottonseed oil, corn oil, peanut oil, linseed oil, etc.; animal oils and fats, such as tallow, lard, etc.; and fish oils and fats, such as whale oil, sperm oil, menhaden oil, etc., are intended. Since an oil or fat is composed of the glyceride of more than one monocarboxylic acid, the new insecticide and fungicide prepared from an oil or fat will contain an intimate and nonseparable mixture of all of the new copper-arsenite compounds of the monocarboxylic acids present. For example, coconut oil is composed of the glycerides of the monocarboxylic acids and in approximately the following proportions: Caproic 2%, caprylic 9%, capric 10%, lauric 45%, myristic 20%, palmitic 7%, stearic 5%, oleic 2%. Hence, an insecticide and fungicide prepared from coconut oil will contain an intimate mixture of all of the copper-arsenite compounds of the monocarboxylic acids present and in the same relative proportion as present in the oil or fat. Another example is the product obtained when peanut oil is used, the composition of which is approximately as follows: Palmitic 7.3%, stearic 5.5%, archidic 3.6%, lignoceric 2.9%, oleic 56.7%, linoleic 23.1%. Still another example is menhaden oil, which has the approximate composition: Myristic 8%, palmitic 12%, oleic 25%, palmitoleic 17%, linoleic 20%, clupadonic 18%.

The insecticides and fungicides prepared from oils and fats have properties different from that of Paris green or Leibbrandt's palmitic compound. Their density is approximately one half that of Paris green, thus rendering them much more bulky and capable of better coverage on plant foliage. They are insoluble in water and when dry cannot be wet by it without the use of a wetting agent, such as alcohol. They will float indefinitely on top of water, thus rendering them suitable for dusting stagnant waters to control the mosquito larvae. When moistened with alcohol and a suitable emulsifying agent added they make suitable sprays when diluted with water for applying to plant foliage for controlling insects. They are safer to use on plant foliage than Paris green as they are less easily hydrolized. As the new insecticide and fungicide contains more or less amounts of copper salts of the fatty acids, they also act as fungicides, as it is a well known fact that most copper salts are good fungicides.

In carrying out my invention, I first form an alkali salt of the fatty acids by saponifying a vegetable, animal or fish oil or fat containing the mixed glycerides of any of the monocarboxylic acids in the series $C_nH_{2n}O_2$, $C_nH_{2n-2}O_2$, $C_nH_{2n-4}O_2$, $C_nH_{2n-6}O_2$, and $C_nH_{2n-8}O_2$. The resulting soap may be separated from the other saponification products or used without separation in the formation of the new composition of matter. To the soap solution is added the required amount of a solution of a water-soluble arsenite, for example, sodium or potassium arsenite. The soap-arsenite mixture is partially neutralized with a suitable acid, for example, dilute hydrochloric acid, the solution however being kept on the alkaline side to prevent precipitation of the fatty acids. To the partially neutralized solution is slowly added with vigorous agitation, a solution of a soluble copper salt, for example, copper chloride. A greenish yellow precipitate immediately forms. The mass should have an acid reaction when all of the copper solution has been added. If alkaline a suitable acid, for example, dilute hydrochloric acid, is added until the reaction is acid. The mixture is now heated, with continuous agitation, until the reaction is completed as shown by a color change in the precipitate from a greenish yellow color to a bluish green or green color. This may entail boiling for a short time. The precipitate may be filtered at once, but it is preferable to allow it to stand for a few hours. The precipitate is well washed with water by any suitable means to free it of acid and other water-soluble products. It is then dried, preferably in a current of warm air.

By way of illustration of my invention, I submit the following examples:

Example 1

To produce 100 grams of a coconut oil insecticide and fungicide product, the following materials and weights are required:

| | Grams |
|---|---|
| Coconut oil | 30 |
| Sodium arsenite ($Na_2HAsO_3$) | 55 |
| Cupric chloride ($CuCl_2.2H_2O$) | 55 |

The calculated arsenic and copper content of an insecticide made from coconut oil completely combined is 45.6% $As_2O_3$ and 24.4% CuO.

Example 2

To produce 100 grams of an insecticide and fungicide from linseed oil, the following materials and weights are required:

| | Grams |
|---|---|
| Linseed oil | 30 |
| Sodium arsenite ($Na_2HAsO_3$) | 55 |
| Copper sulphate ($CuSO_4.5H_2O$) | 70 |

The caluculated arsenic and copper content of an insecticide and fungicide prepared from a completely combined linseed oil is 39.2% $As_2O_3$, and 21.6% CuO.

Example 3

| | Grams |
|---|---|
| Menhaden oil | 27 |
| Sodium arsenite ($Na_2HAsO_3$) | 60 |
| Cupric chloride ($CuCl_2.2H_2O$) | 50 |

The calculated arsenic and copper content of an insecticide and fungicide prepared from menhaden oil is 40.7% $As_2O_3$ and 22.8% CuO.

All of the oils and fats of vegetable, animal and fish origin containing glycerides of the monocarboxylic acids of the aforementioned series of fatty acids form copper-arsenite compounds, and may be used in preparing my new insecticide and fungicide.

Having thus described my invention, what I claim for Letters Patent is:

1. An insecticide and fungicide comprising the complex products of the reactions between a solution of an alkali metal arsenite, an inorganic cupric salt and alkali metal salts of the group consisting of vegetable, animal and fish oils, containing mixed glycerides of monocarboxylic acids of the series having the general formula $C_nH_{2n}O_2$, $C_nH_{2n-2}O_2$, $C_nH_{2n-4}O_2$, $C_nH_{2n-6}O_2$, and $C_nH_{2n-8}O_2$.

2. An insecticide and fungicide comprising the complex products of the reactions between a solution of an alkali metal arsenite, an inorganic cupric salt and alkali metal salts of coconut oil.

3. An insecticide and fungicide comprising the complex products of the reactions between a solution of an alkali metal arsenite, an inorganic cupric salt and alkali metal salts of tallow.

4. An insecticide and fungicide comprising the complex products of the reactions between a solution of an alkali metal arsenite, an inorganic cupric salt and alkali metal salts of menhaden oil.

FREDERICK E. DEARBORN.